United States Patent
Nakasuji et al.

[11] Patent Number: 5,945,660
[45] Date of Patent: Aug. 31, 1999

[54] COMMUNICATION SYSTEM FOR WIRELESS BAR CODE READER

[75] Inventors: Akio Nakasuji, Hyogo; Toshihiro Yoshioka; Yoshinori Nishida, both of Osaka, all of Japan

[73] Assignee: Matsushita Electric Industrial Co., Ltd., Osaka, Japan

[21] Appl. No.: 08/949,543

[22] Filed: Oct. 14, 1997

[30] Foreign Application Priority Data

Oct. 16, 1996 [JP] Japan ..................... 8-273176

[51] Int. Cl.⁶ ..................... G06K 7/10
[52] U.S. Cl. ............... 235/462.46; 235/462.25; 235/472.01; 235/472.02
[58] Field of Search ............ 235/472.01, 472.02, 235/375, 383, 462.46, 462.25

[56] References Cited

U.S. PATENT DOCUMENTS

| | | | |
|---|---|---|---|
| 5,157,687 | 10/1992 | Tymes | 235/462 |
| 5,313,051 | 5/1994 | Brigida et al. | 235/375 |
| 5,528,025 | 6/1996 | Swintek | 235/472 |
| 5,594,228 | 1/1997 | Swartz et al. | 235/383 |
| 5,665,956 | 9/1997 | La et al. | 235/472 |
| 5,708,418 | 1/1998 | Ushida et al. | 340/568 |
| 5,742,237 | 4/1998 | Bledsoe | 235/375 |
| 5,745,525 | 4/1998 | Hunsinger et al. | 375/285 |
| 5,756,984 | 5/1998 | Kobayashi | 235/462 |

Primary Examiner—Michael G. Lee
Assistant Examiner—Diane I. Lee
Attorney, Agent, or Firm—Pearne, Gordon, McCoy & Granger LLP

[57] ABSTRACT

A communication system for a wireless bar code reader includes a wireless bar code reader transmitter for reading bar code information and transmitting a radio signal, and a receiver for receiving the radio signal from the wireless bar code reader transmitter and transmitting reception data to a host computer, wherein the receiver includes a reception indication section for indicating that the reception data is received. Accordingly, it is possible to notify an operator that the data has been transmitted normally and further to urge the operator to retransmit the data when the data has not been transmitted normally.

11 Claims, 5 Drawing Sheets

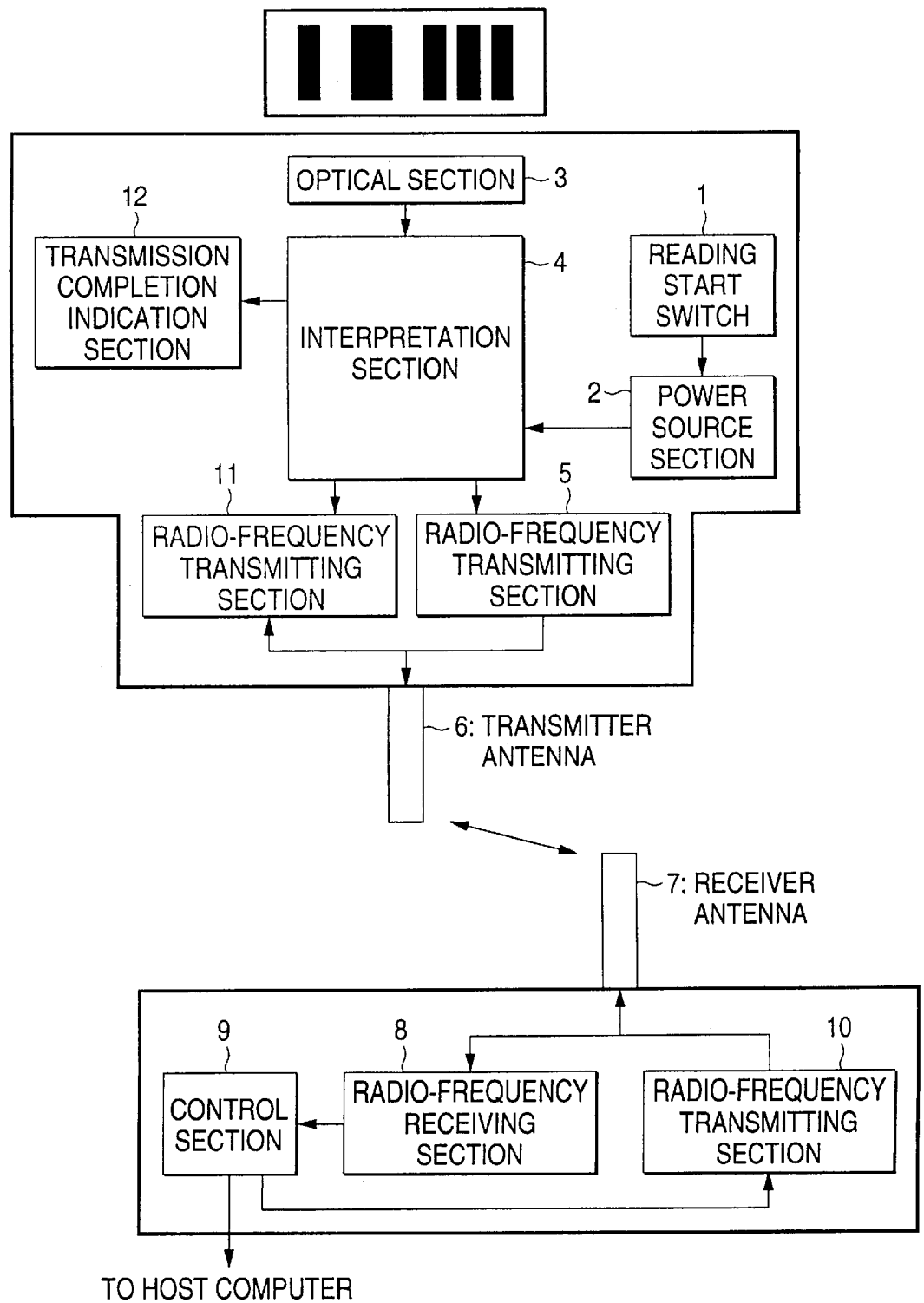

COMMUNICATION SYSTEM FOR WIRELESS BAR CODE READER

BACKGROUND OF THE INVENTION

The present invention relates to a communication system for a wireless bar code reader used for the point of sales (POS) system and the management of physical distribution or production.

The conventional communication system of the wireless bar code reader includes, as disclosed in JP-A 2-224194, a wireless bar code reader transmitter containing a bar code reader section therein and a receiver for receiving data from the transmitter and transmitting the data thus received to a host computer. Each of the transmitter and the receiver contains both a radio transmitting section and a radio receiving section. In such configuration, the communication is performed by using the answering method wherein the transmission of data is confirmed between the radio transmitting section and the radio receiving section of the transmitter and those of the receiver such that the receiver returns an acknowledge (ACK) signal when the data is received normally, but returns a non-acknowledge (NAK) signal when the data is received erroneously.

In particular, since the wireless system mostly employed in the wireless bar code reader uses weak radio wave which is small in the radio wave intensity, such a system has employed the answering method so as to improve the communication accuracy.

FIG. 5 is a diagram showing an arrangement of the conventional communication system for the wireless bar code reader. In FIG. 5, when an operator depresses a reading start switch 1, a power is supplied to a wireless bar code reader transmitter from a power source section 2. An image signal of a bar code is output from an optical section 3, and the image signal of the bar code is interpreted as data by an interpretation section 4. The data thus interpreted is sent to a radio-frequency transmitting section 5, which in turn modulates the data into a radio signal with a constant carrier frequency. The radio signal thus modulated is radiated to the air from a transmitter antenna 6. The radio signal radiated in the air is received by a receiver antenna 7 of a receiver and the radio signal thus received is demodulated and converted in reception data by a radio-frequency receiving section 8. The reception data thus received is subjected to the error detection and the error correction by a control section 9.

When the data is received normally, the control section 9 returns an ACK (acknowledge) signal to a radio-frequency transmitting section 10 and also transmits the reception data to a host computer. The ACK signal is modulated in a radio signal with a constant carrier frequency by the radio-frequency transmitting section 10, and the radio signal thus modulated is radiated in the air from the receiver antenna 7. The radio signal radiated in the air is received by the transmitter antenna 6 of the wireless bar code reader transmitter, then the received signal is demodulated by a radio-frequency receiving section 11 and sent to the interpretation section 4. The interpretation section 4 makes a transmission completion indication section 12 indicate the completion of the data transmission and then the power source section 2 cuts off the power.

When the data is not received normally, the control section 9 returns a NAK (non-acknowledge) signal to the radio-frequency transmitting section 10, which in turn modulates the NAK signal in a radio signal with a constant carrier frequency. The radio signal thus modulated is radiated in the air from the receiver antenna 7. The radio signal radiated in the air is received by the transmitter antenna 6 of the wireless bar code reader transmitter, then modulated by the radio-frequency receiving section 11 and sent to the interpretation section 4. Then, the interpretation section 4 resends the data.

However, since each of the transmitter and the receiver of the conventional communication system of the wireless bar code reader contains therein both the radio transmitting section and the radio receiving section, the consumption power of the system is large and further it is difficult to miniaturize the system. In particular, since the radio receiver is large in the size of a circuit arrangement, which obstructs the miniaturization of the system.

Further, when the communication system of the wireless bar code reader is arranged in a manner that the wireless bar code reader transmitter containing a bar code reader section is provided with only the radio transmission section and the receiver for transmitting data to the host computer is provided with only the radio receiving section, such a system can not employ the answering method for returning the ACK and NAK signals. As a consequence, such a system has the disadvantage that the communication accuracy is degraded and lack of data transmission as to data read by a bar code may occur.

Further, in such a system, since the radio communication takes time, it takes much time from the reading of a bar code to the completion of data transmission to the receiver. Accordingly, such a system requires much time for operation.

SUMMARY OF THE INVENTION

A communication system for a wireless bar code reader according to the present invention intends to overcome the aforesaid problems. An object of the present invention is to provide a communication system for a wireless bar code reader which is small in power consumption and capable of confirming the failure or success of the communication.

In order to achieve the aforesaid object, a communication system for a wireless bar code reader according to the first aspect of the present invention comprises: a wireless bar code reader transmitter for reading bar code information and transmitting a radio signal and a receiver for receiving the radio signal from the wireless bar code reader transmitter and transmitting reception data to a host computer. In the communication system, the wireless bar code reader transmitter includes an optical section for detecting a bar code and outputting a signal representing the detected bar code, an interpretation section for interpreting the signal from the optical section and converting into data, and a radio transmitting section for modulating the data into the radio signal and radiating in the air, and the receiver includes a radio receiving section for receiving and demodulating the radio signal radiated in the air, an analyzing section for analyzing and performing error detection and error correction as to the demodulated radio signal to thereby convert the demodulated radio signal into reception data and for transmitting the reception data to the host computer when it is determined that the demodulated radio signal is normal, and a reception indication section for indicating that the reception data is received.

According to the above-mentioned communication system for a wireless bar code reader according to the present invention, since the receiver is provided with the indication section which indicates a fact that the receiver received the reception data normally, it is possible to notify an operator that the data has been transmitted normally and further to urge the operator to retransmit the data when the data has not been transmitted normally. Accordingly, since the occurrence of the lack of data transmission can be prevented even if the responding method using the ACK and NAK signals is not employed, the wireless bar code reader transmitter is not required to include a radio receiver section therein, whereby the system can reduce an amount of power consumption and the size thereof. In other words, the wireless bar code reader is employed in most cases originally so as to improve the workability by removing the wires of a wire bar code reader. Accordingly, since an operator operates the bar code reader near a host computer, it is possible to sufficiently notify the operator of the result of the data reception so long as the receiver is provided with the indication section. The indication section can be formed by a buzzer and an LED (light emitting diode) etc.

In the communication system for the wireless bar code reader, the reception indication section changes indication manners between cases where the receiver received the reception data normally and where the receiver received the reception data erroneously.

According to the above-mentioned communication system, since the indication section changes the indication manner when the receiver could not receive the data normally to thereby notify an operator of the fact, the operator is immediately able to start the retransmission operation, whereby it is possible to reduce an operation time. If the buzzer or LED is employed as the indication section, the buzzer sound and the color of emitted light from the LED are changed.

Further, in the communication system for the wireless bar code reader, when the receiver received the reception data normally, the reception indication section changes the indication manner as compared with a previous case where the receiver received a previous reception data.

According to the above-mentioned communication system, since, when the receiver received the data normally, the indication section changes the indication manner as compared with a previous case where the receiver received the data normally, to thereby notify an operator of the fact. Accordingly, before the indication means indicates the data reception, an operator is able to read the next bar code. Further, since it is possible to recognize which data of the bar code was failed in communication even when the radio communication was failed, it is possible to avoid the lack of data communication.

Furthermore, in the communication system for the wireless bar code reader, the wireless bar code reader transmitter transmits the radio signal in which an order symbol representing a transmission order of the data is added, and the receiver discriminates the order symbol in the reception data and changes indication manners between cases where the discriminated order of the reception data is correct and erroneous.

Accordingly, it is possible to prevent such a matter that the same data is erroneously transmitted sequentially.

A communication system for a wireless bar code reader according to the second aspect of the present invention comprises: a wireless bar code reader transmitter for reading bar code information and transmitting a radio signal and a receiver for receiving the radio signal from the wireless bar code reader transmitter and transmitting reception data to a host computer. In the communication system, the wireless bar code reader transmitter includes an optical section for detecting a bar code and outputting a signal representing the detected bar code, an interpretation section for interpreting the signal from the optical section and converting into data, and a radio transmitting section for modulating the data into the radio signal and radiating in the air, and the receiver includes a radio receiving section for receiving and demodulating the radio signal radiated in the air, and an analyzing section for analyzing and performing error detection and error correction as to the demodulated radio signal to thereby convert the demodulated radio signal into reception data and for transmitting the reception data to the host computer when it is determined that the demodulated radio signal is normal, in that the wireless bar code reader transmitter transmits the data plural times.

According to the above-mentioned communication system, since the wireless bar code reader transmitter transmits the data read from a bar code plural times, it is possible to improve the communication accuracy. In this respect, the responding method using the ACK and NAK signals requires a time for waiting for a response. In contrast, in the case where an amount of transmission data is a small value of several tens bytes like the wireless bar code reader, the communication time is short even when the data is transmitted two or three times. Further, in the case where the data can not be communicated even if the data is transmitted plural times, it is impossible to communicate the data even in the responding method using the ACK and NAK signals as well as this system. As a consequence, in the communication system for a wireless bar code reader according the present invention, it is possible to perform the communication with accuracy equal to or higher than that of the conventional responding method even if the transmitter does not include a radio receiving section.

In the communication system, the wireless bar code reader transmitter transmits the data plural times with different frequencies, respectively.

According to the above-mentioned communication system, since the wireless bar code reader transmitter transmits the data plural times with different frequencies, respectively, it is possible to avoid the fading phenomenon and to improve the communication accuracy.

A communication system a wireless bar code reader according to the third aspect of the present invention comprises a wireless bar code reader transmitter for reading bar code information and transmitting a radio signal and a receiver for receiving the radio signal from the wireless bar code reader transmitter and transmitting reception data to a host computer. In the communication system, the wireless bar code reader transmitter includes an optical section for detecting a bar code and outputting a signal representing the detected bar code, an interpretation section for interpreting the signal from the optical section and converting into data, and a radio transmitting section for modulating the data into the radio signal and radiating in the air, and the receiver includes a radio receiving section for receiving and demodulating the radio signal radiated in the air, and an analyzing section for analyzing and performing error detection and error correction as to the demodulated radio signal to thereby convert the demodulated radio signal into reception data and for transmitting the reception data to the host computer when it is determined that the demodulated radio signal is normal, in that the radio transmission section of the wireless bar code reader transmitter is provided with a plurality of transmission antennas which differ in characteristics or mounting positions from each other.

In the above-mentioned communication system for a wireless bar code reader, the transmission antenna means of the radio transmission section of the wireless bar code reader transmitter is formed by a plurality of transmission antennas which differ in characteristics or mounting positions from each other. Accordingly, even when one of the antennas can not perform the communication, it is possible to perform the communication by the remaining antenna(s), so that it is possible to improve the communication accuracy. In this respect, the electric fields of radio wave include the static electric field, the electromagnetic electric field and the radiation electric field, which differ in the radio wave propagation manner and in the influence by an obstacle. Further, there appears variations in the electric field strength of a radio wave, that is depending on phenomenon, depending on the wavelength of radio wave and the positional relation between a transmission antenna and a receiving antenna. Accordingly, since the communication state is changed even in the case where only the position of a transmission antenna is changed, it is possible to improve the communication accuracy by providing a plurality of the transmission antennas arranged in the aforesaid manner. There is known a diversity antenna which is arranged to have two receiving antennas based on a principle similar to the transmission antennas of the present invention. However, according to such a diversity antenna, it is difficult to switch the two receiving antennas on the receiver side since the receiver is required to detect an interruption point of the communication at the time of switching the receiving antennas. In contrast, according to the transmission antennas of the present invention arranged in the aforesaid manner, the plurality of transmission antennas can be switched easily since an interruption point of the communication can be easily detected on the transmitter side.

A communication system for a wireless bar code reader according to the fourth aspect of the present invention comprises a wireless bar code reader transmitter for reading bar code information and transmitting a radio signal and a receiver for receiving the radio signal from the wireless bar code reader transmitter and transmitting reception data to a host computer. In the communication system, the wireless bar code reader transmitter includes an optical section for detecting a bar code and outputting a signal representing the detected bar code, an interpretation section for interpreting the signal from the optical section and converting into data, a radio transmitting section for modulating the data into the radio signal and radiating in the air, a memory section for storing the data interpreted by the interpretation section, and a transmission switch for retransmitting the data stored in the memory section, and the receiver includes a radio receiving section for receiving and demodulating the radio signal radiated in the air, and an analyzing section for analyzing and performing error detection and error correction as to the demodulated radio signal to thereby convert the demodulated radio signal into reception data and for transmitting the reception data to the host computer when it is determined that the demodulated radio signal is normal.

According to the communication system for a wireless bar code reader, it is provided with the memory section for storing the data interpreted by the interpretation section and the transmission switch for retransmitting the data stored in the memory section. Accordingly, in the case where the communication can not be performed, it is possible to retransmit the data by depressing the transmission switch after an operator moves the wireless bar code reader transmitter or the receiver to a position where the communicating is possible.

Further, in the communication system for the wireless bar code reader, the memory section stores a plurality of the data and the data stored in the memory section is transmitted when the transmission switch is depressed.

According to the above-mentioned communication system, it is possible to read bar codes sequentially without minding the communication time. Accordingly, it is possible to make the operation time shorter.

Still further, in the communication system for the wireless bar code reader, a transmitter antenna is formed by a loop antenna which is arranged to surround an optical path of the optical section at a place close to a bar code reading mouth. Therefore, the optical path of the optical section is not blocked off, and the loop antenna having a large loop area can be arranged at a place close to the bar code reading mouth. A gain of the loop antenna becomes better if it has a large loop area. Further, the bar code reading mouth will not be covered by a operator's hand when he or she operates the wireless bar code reader, so that the radiation wave will not be attenuated. Thus, the radiation of the radio wave can be efficiently performed.

BRIEF DESCRIPTION OF THE DRAWINGS

FIG. 5 is a diagram showing an arrangement of the conventional communication system for a wireless bar code reader.

DETAILED DESCRIPTION OF PREFERRED EMBODIMENT

An embodiment according to the present invention will be explained with reference to the drawings.

Figure 1:
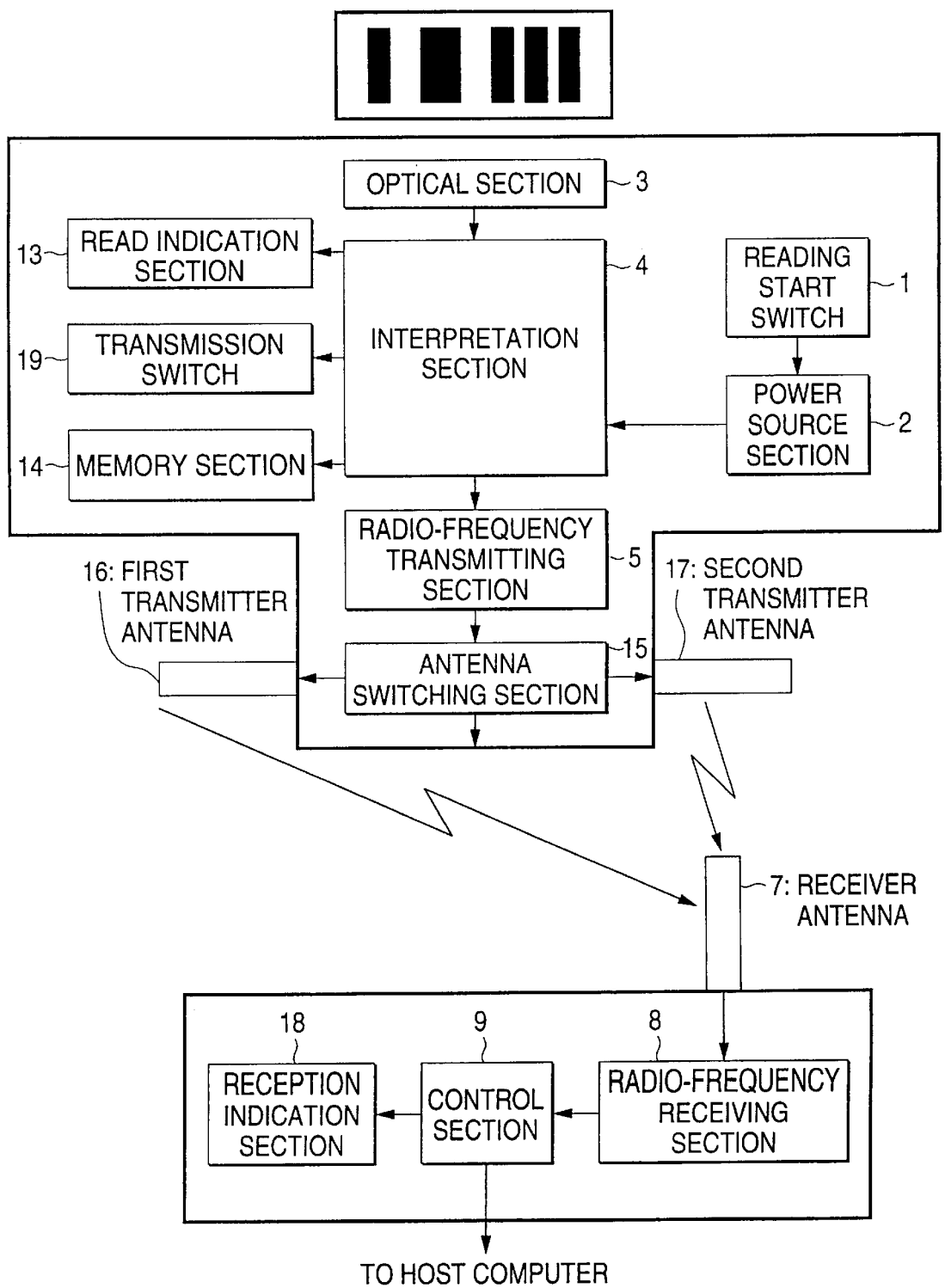
FIG. 1 is a diagram showing the configuration of a communication system for a wireless bar code reader according to the present invention.

FIG. 1 is a diagram showing the configuration of a communication system for a wireless bar code reader according to the present invention. In FIG. 1, when an operator depresses a reading start switch 1, a power of 5V is supplied to a bar code reader transmitter from a power source section 2 which is formed by battery (e.g. two size-AA dry cells) and a boosting DC/DC converter.

An image signal of a bar code is output from an optical section 3 which is formed by a focusing lens with a focal length of 17 mm and an F-number of 15 and a CCD image sensor of 3,000 bits.

The image signal of a bar code is subjected to an analog-to-digital conversion, taken in and then interpreted as data 24 by an interpretation section 4 which is formed by a 16-bits MPU (microprocessor unit) for interpretation.

When the interpretation is completed, a read indication section 13 formed by an LED (light emitting diode) is turned on to thereby indicate the completion of the interpretation.

Simultaneously, the data 24 is stored in a memory section 14 formed by an SRAM (static random access memory) of 8K bytes together with an order symbol representing the interpreted order of the data. The memory section 14 is capable of holding the storage contents thereof even when the power from the power source section 2 is cut off since the memory section is backed up by a backup power source formed by a coin type lithium battery. In this embodiment, an external SRAM for the interpretation MPU is used as the storage section 14. Alternatively, this embodiment may be modified in a manner that the data is stored in an internal SRAM for the interpretation MPU, and the internal SRAM is backed up together with the interpretation MPU by placing the interpretation MPU in a sleeping state. The memory section 14 is able to store a plurality of data by changing a mode.

Figure 2:
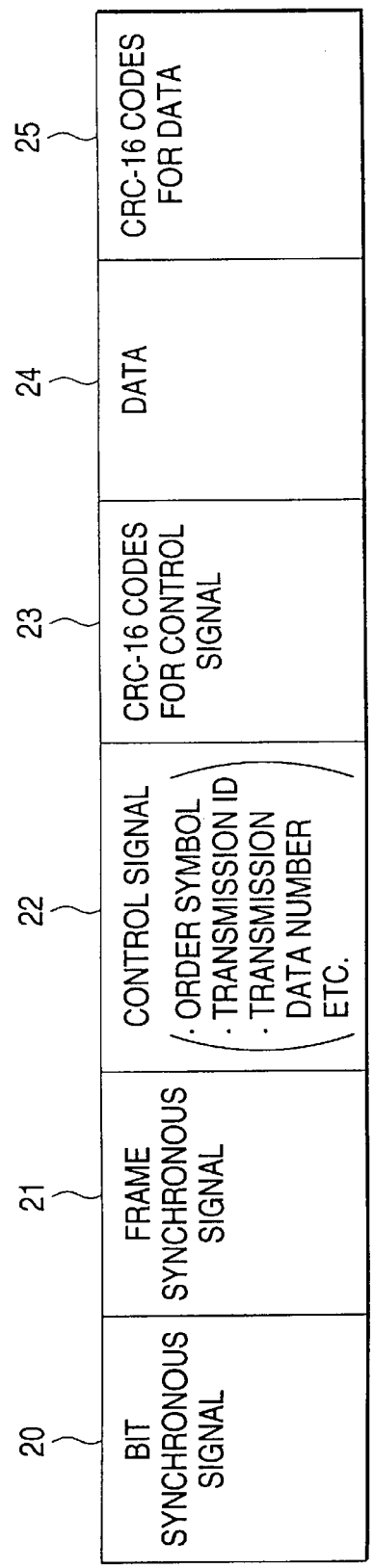
FIG. 2 is a diagram showing transmission data in the communication system of FIG. 1.

FIG. 2 is a diagram showing transmission data in the embodiment according to the present invention. The data 24 is converted into a bit sequence of binary values 0 and 1 which is added with a bit synchronous signal 20 composed of 11 bits, a frame synchronous signal 21 composed of 16 bits, a control signal 22 having an order symbol, a transmission ID and a transmission data number etc., CRC-16 codes 23 for the control signal serving as error correction codes for the control signal, CRC-16 codes 25 for data serving as error correction codes for data. Such a signal sequence shown in FIG. 2 is sent to a radio-frequency transmission section 5 four times.

The data 24 is modulated in a radio signal with carrier frequencies of 49.8315 MHz and 49.8615 MHz at every one data by the radio-frequency transmission section 5. In this case, the data is modulated by the frequency shift keying (FSK) modulation at the modulation rate of 9,600 bps. The radio signal thus modulated is switched at every two data by an antenna switching section 15 to send to a first transmitter antenna 16 and a second transmitter antenna 17 and then radiated in the air.

Figure 3A:
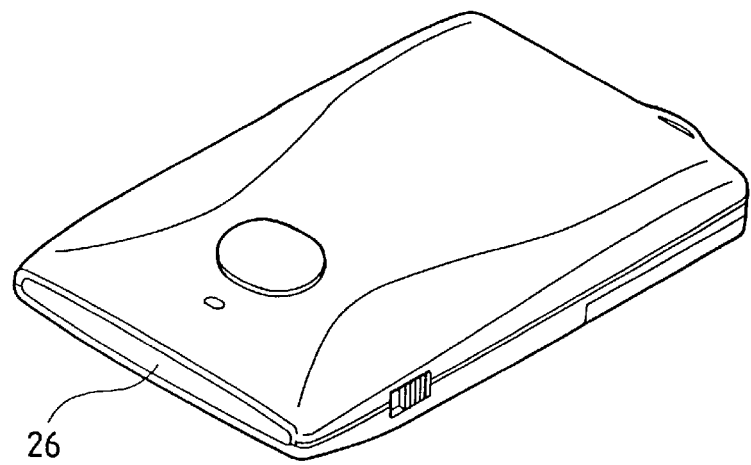
FIG. 3A is a perspective external view of the bar code reader transmitter in the communication system of FIG. 1.
Figure 3B:
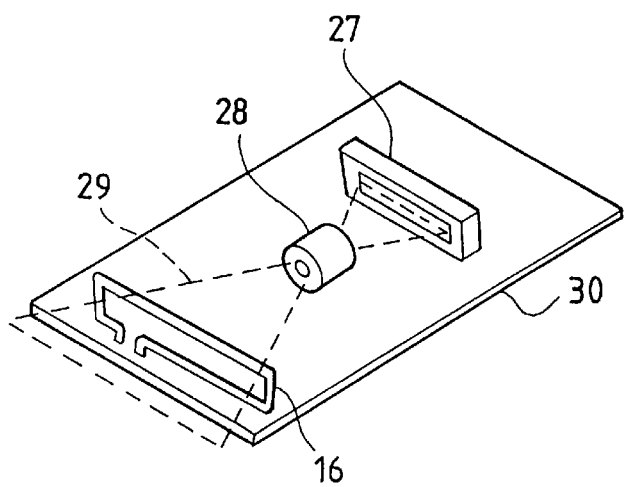
FIG. 3B is a diagram showing the positional relation of the first transmitter antenna and an optical path of the optical section in the bar code reader transmitter.
Figure 3C:
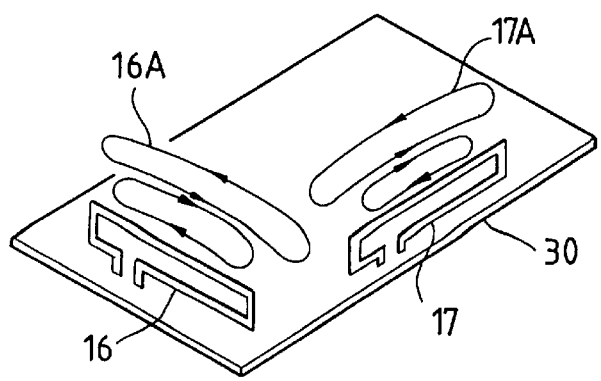
FIG. 3C is a diagram showing the positional relation of the first transmitter antenna and the second transmitter antenna within the bar code reader transmitter.

FIG. 3A is a perspective external view of the bar code reader transmitter in the communication system as shown in FIG. 1. FIG. 3B is a diagram showing the positional relation of the first transmitter antenna and an optical path of the optical section in the bar code reader transmitter. FIG. 3C is a diagram showing the positional relation of the first transmitter antenna and the second transmitter antenna within the bar code reader transmitter.

As shown in these drawings, the first transmitter antenna 16 is formed by a loop antenna which stands on the substrate 30 at a position close to a bar code reading mouth 26 of the wireless bar code reader transmitter. The first transmitter antenna 16 surrounds an optical path 29 of an optical section composed of a CCD image sensor 27 and a light receiving lens 28, so that the optical path is not blocked. Accordingly, a loop antenna having a large loop area can be arranged at a place closed to the bar code reading mouth 26.

According to the embodiment, although the optical section is formed by the CCD image sensor 27 and the light receiving lens 28, it may be formed by a optical section scanning a laser beam.

Further, the second transmitter antenna 17 is formed by a loop antenna which stands on the substrate 30 and is disposed to cross orthogonally to the first transmitter antenna 16. Accordingly, since direction of the electric fields radiated from these antennas differ to each other, the electric field radiated in the weak electric field direction by one of these antennas can be covered by the electric field radiated by the other antenna and also the electric field radiated in the weak electric field direction by the other antenna can be covered by the electric field radiated by the one antenna.

In this manner, according to this embodiment, each of the first transmitter antenna 16 and the second transmitter antenna 17 is formed by the loop antenna which is low in the directivity and small in size, in view of the portability of the bar code reader transmitter.

Although, in this embodiment, the same kind of antennas are disposed so as to be directed to different directions to each other, two antennas with different characteristics may be employed.

After the transmission of the data four times, the power source section 2 cuts off its output power so as to save the power consumption.

According to such a configuration, since the receiver may receive normally at least one of the four radio signals which differ in carrier frequencies and direction of radiated electric fields from one another, the system is hardly influenced by fading phenomenon and noise and so the communication accuracy is improved.

Normally, an amount of information contained in a bar code is not larger than 30 bytes in most cases, the data of 30 bytes will be a bit sequence of 330 bits when the modulation rate is 9,600 bps. In this case, since the transmission time of such data is a short period of 33 msec, an operator does not feel that the transmission speed is slow even if the data is transmitted four times.

The radio signal radiated in the air is received by a receiver antenna 7 of the receiver. Since the receiver antenna 7 is fixed to the receiver, it is formed by a monopole antenna which is large in size but large in gain.

The radio signals thus received are demodulated by a radio-frequency receiver section 8, which is able to simultaneously demodulate the radio signal with the carrier frequencies of 49.8315 MHz and 49.8615 MHz, in a bit sequence of bits 0 and 1 at every carrier frequency of 49.8315 MHz and 49.8615 MHz. Then, the bit sequences thus modulated are sent to a control section 9 formed by a control MPU of 16 bits.

The control section 9 simultaneously takes in the two bit sequences thus received by using two SIOs contained in the control MPU and retrieves the bit synchronous signal 20 of 11 bits and the frame synchronous signal 21 of 16 bits each added at the time of transmission.

Figure 4:
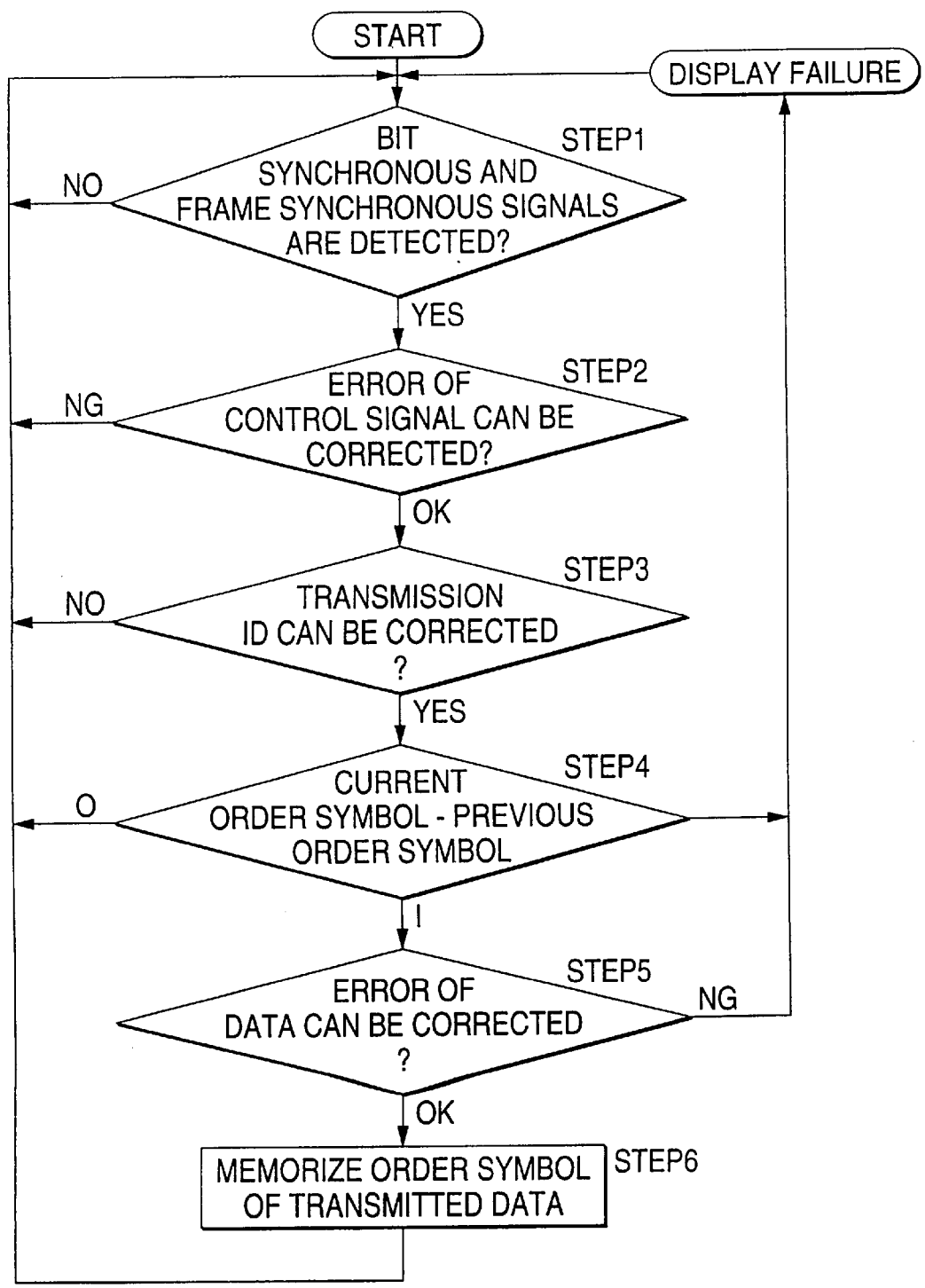
FIG. 4 is a diagram showing a flow chart for explaining the bit sequence analyzing procedure in the control section of the receiver.

FIG. 4 is a diagram showing a flow chart for explaining the bit sequence analyzing procedure in the control section of the receiver in the communication system for a wireless bar code reader according to this embodiment.

In step 1, if the control section 9 detects the bit synchronous signal 20 of 11 bits and the frame synchronous signal 21 of 16 bits, the control section takes in the succeeding control signal 22 and the CRC-16 codes 23 for the control signal. Since the control signal has a fixed length, it is required to analyze only the predetermined bit length.

In step 2, the error detection and the error correction are performed as to the control signal thus taken in. If it is determined that it is impossible to correct the error, the process returns to the start, then the bit synchronous signal 20 of 11 bits and the frame synchronous signal 21 of 16 bits are again retrieved. In contrast, if it is determined that there is no error or it is possible to correct the error, the control signal 22 is analyzed.

In step 3, the transmission ID of the control signal 22 is compared with a transmission ID which is set in advance and capable of being received. If it is determined that the transmission ID of the control signal 22 does not coincide with the set transmission ID, the process returns to the start, then the bit synchronous signal 20 of 11 bits and the frame synchronous signal 21 of 16 bits are again retrieved. In contrast, if it is determined that the transmission ID of the control signal 22 coincides with the set transmission ID, the process proceeds to the comparison of the order symbols.

In step 4, the current order symbol within the current control signal 22 is compared with the previous order symbol which is contained within the control signal received just before the current control signal and stored in a memory. If it is determined that the current order symbol coincides with the previous order symbol, it is determined that the same data has been received twice, then the process returns to the start. Then, the bit synchronous signal 20 of 11 bits and the frame synchronous signal 21 of 16 bits are again retrieved. If it is determined that the current order symbol is larger than the previous order symbol by two or more, it is determined that there is a lack of reception data. Then, a reception indication section 18 formed by a buzzer and an LED (light emitting diode) is operated in a manner that the buzzer is sequentially sounded plural times and the LED is sequentially turned on and off plural times to thereby notify an operator of the occurrence of a failure. Then, the process returns to the start, and the bit synchronous signal 20 of 11 bits and the frame synchronous signal 21 of 16 bits are again retrieved. If it is determined that the current order symbol is larger than the previous order symbol by one, the succeeding data 24 and the succeeding CRC-16 codes 25 for data are taken in. Since the data 24 has a variable length, the number of bits to be taken in is calculated and determined with reference to and on the basis of the transmission data number etc. within the control signal 22.

In step 5, the data thus taken in is subjected to the error detection and the error correction. If it is determined that it is impossible to correct the error, it is determined that the data reception was failed. Then, the buzzer and the LED of the reception indication section 18 are respectively sounded and turned on and off plural times to thereby notify an operator of the occurrence of a failure. Thereafter, the process returns to the start, and the bit synchronous signal 20 of 11 bits and the frame synchronous signal 21 of 16 bits are again retrieved. In contrast, if it is determined that there is no error or it is possible to correct the error, the buzzer and the LED of the reception indication section 18 are respectively sounded and turned on and off the times different from the previous case where the data was received normally, that is, once or twice, and further the reception data is transmitted to the host computer. Further, the order symbol currently received is stored in the memory (step 6). Thereafter, the process returns to the start, then the bit synchronous signal 20 of 11 bits and the frame synchronous signal 21 of 16 bits are again retrieved so as to prepare for receiving the succeeding data.

The buzzer and the LED of the reception indication section 18 are respectively sounded and turned on and off for a short period when the data is received normally, but they are sounded and turned on and off for a long period when there is a failure so as to prevent that an operator is not aware of the occurrence of the failure.

In the case where the reception indication section 18 indicates the failure or does not indicates any indication, if an operator brings the bar code reader transmitter near the receiver and depresses a transmitter switch 19, the power source section 2 starts supplying the power again, whereby the data 24 and the order symbol stored in the memory section 14 are transmitted. At the time of retransmission, since it is possible to bring the bar code reader transmitter and transmit the data at the location where the receiver can easily receive the data, there scarcely arises the failure of the communication. Further, when the reception indication section 18 indicates that the order of the reception data is erroneous, an operator confirms the reception data and operates the bar code reader transmitter to read the bar code having been lacked. As a consequence, the data is transmitted again, so that the lack of the data due to the failure of the communication can be prevented.

As described above, in the communication system for a wireless bar code reader according to the present invention, since it is possible to eliminate the radio receiving section and the radio transmitting section from the wireless bar code reader transmitter and the receiver, respectively, it is possible to reduce an amount of power consumption and the size as to each of the wireless bar code reader transmitter and the receiver. Further, in the communication system according to the present invention, the communication accuracy can be improved rather than the responding method using the ACK and NAK signals.

Further, it is possible for an operator to perform the operations without minding the communication time.

As clear from the aforesaid description, according to the communication system for a wireless bar code reader according to the first aspect of the present invention, it is possible to notify an operator that the data has been transmitted normally and further to urge the operator to retransmit the data when the data has not been transmitted normally. Accordingly, the system can reduce an amount of power consumption and the size thereof.

Further, the operator is immediately able to start the retransmission operation, whereby it is possible to reduce an operation time.

Furthermore, before the indication means indicates the data reception, an operator is able to read the next bar code. Moreover, since it is possible to recognize which data of the bar code was failed in communication even when the radio communication was failed, it is possible to avoid the lack of data communication.

Still further, it is possible to prevent such a matter that the same data is erroneously transmitted sequentially.

According to the communication system for a wireless bar code reader according to the second aspect of the present invention, since the wireless bar code reader transmitter transmits the data read from a bar code plural times, it is possible to improve the communication accuracy.

Further, even when one of the antennas can not perform the communication, it is possible to perform the communication by the remaining antenna(s), so that it is possible to improve the communication accuracy.

Furthermore, since the wireless bar code reader transmitter transmits the data plural times with different frequencies, respectively, it is possible to avoid the fading phenomenon and to improve the communication accuracy.

According to the communication system for a wireless bar code reader according to the fourth aspect of the present invention, in the case where the communication can not be performed, it is possible to retransmit the data by depressing the transmission switch after an operator moves the wireless bar code reader transmitter or the receiver to a position where the communicating is possible.

Further, the memory section stores a plurality of the data and the data stored in the memory section is transmitted when the transmission switch is depressed, it is possible to read bar codes sequentially without minding the communication time. Accordingly, it is possible to make the operation time shorter.

What is claimed is:

1. A communication system for a wireless bar code reader comprising:

a wireless bar code reader transmitter for reading bar code information and transmitting a radio signal; and a receiver for receiving the radio signal from said wireless bar code reader transmitter and transmitting reception data to a host computer;

said wireless bar code reader transmitter including:

an optical section for detecting a bar code and outputting a signal representing the detected bar code;

an interpretation section for interpreting the signal from said optical section and converting into data; and a radio transmitting section for modulating the data into the radio signal and radiating in air, and said receiver including:

a radio receiving section for receiving and demodulating the radio signal radiated in air;

an analyzing section for analyzing and performing error detection and error correction as to the demodulated radio signal to thereby convert the demodulated radio signal into reception data and for transmitting the reception data to said host computer when the analyzing section determines that the demodulated radio signal is normal; and a reception indication section for indicating to a user that the reception data is received.

2. A communication system as claimed in claim 1, wherein said reception indication section changes indicating manners to permit the user to differentiate between cases where said receiver received the reception data normally and where said receiver received the reception data erroneously.

3. A communication system as claimed in claim 1, wherein when said receiver received the reception data normally, said reception indication section changes the indication manner as compared with a previous case where said receiver received a previous reception data.

4. A communication system as claimed in claim 1, wherein said wireless bar code reader transmitter transmits the radio signal by adding an order symbol representing a transmission order of the data to the data, and said receiver discriminates the order symbol in the reception data and changes indicate manners to permit the user to differentiate between cases where the discriminated order of the reception data is correct and erroneous.

5. A communication system for a wireless bar code reader comprising:

a wireless bar code reader transmitter for reading bar code information and transmitting a radio signal; and a receiver for receiving the radio signal from said wireless bar code reader transmitter and transmitting reception data to a host computer;

said wireless bar code reader transmitter including:

an optical section for detecting a bar code and outputting a signal representing the detected bar code;

an interpretation section for interpreting the signal from said optical section and converting into data; and a radio transmitting section for modulating the data into the radio signal and radiating in air, and said receiver including:

a radio receiving section for receiving and demodulating the radio signal radiated in air;

an analyzing section for analyzing and performing error detection and error correction as to the demodulated radio signal to thereby convert the demodulated radio signal into reception data and for transmitting the reception data to said host computer when the analyzing section determines that the demodulated radio signal is normal;

wherein said wireless bar code reader transmitter transmits the data plural times regardless of whether said radio signal is received by said receiver.

6. A communication system as claimed in claim 5, wherein said wireless bar code reader transmitter transmits the data plural times with different frequencies, respectively.

7. A communication system for a wireless bar code reader comprising:

a wireless bar code reader transmitter for reading bar code information and transmitting a radio signal; and a receiver for receiving the radio signal from said wireless bar code reader transmitter and transmitting reception data to a host computer;

said wireless bar code reader transmitter including:

an optical section for detecting a bar code and outputting a signal representing the detected bar code;

an interpretation section for interpreting the signal from said optical section and converting into data; and a radio transmitting section for modulating the data into the radio signal and radiating in air, and said receiver including:

a radio receiving section for receiving and demodulating the radio signal radiated in air;

an analyzing section for analyzing and performing error detection and error correction as to the demodulated radio signal to thereby convert the demodulated radio signal into reception data and for transmitting the reception data to said host computer when the analyzing section determines that the demodulated radio signal is normal;

wherein said radio transmission section of said wireless bar code reader transmitter comprises a plurality of transmission antennas which differ in characteristics or mounting positions from each other, and wherein data is transmitted from each of said plurality of antennas.

8. A communication system as claimed in claim 7, wherein each of said transmission antennas radiates a radio signal different frequency, respectively.

9. A communication system for a wireless bar code reader comprising:

a wireless bar code reader transmitter for reading bar code information and transmitting a radio signal; and a receiver for receiving the radio signal from said wireless bar code reader transmitter and transmitting reception data to a host computer;

said wireless bar code reader transmitter including:

an optical section for detecting a bar code and outputting a signal representing the detected bar code;

an interpretation section for interpreting the signal from said optical section and converting into data;

a radio transmitting section for modulating the data into the radio signal and radiating in air;

a memory section for storing the data interpreted by said interpretation section; and a user-operable transmission switch, said transmission switch, upon actuation by a user, causes the data stored in said memory section to be retransmitted, and said receiver including:

a radio receiving section for receiving and demodulating the radio signal radiated in air;

an analyzing section for analyzing and performing error detection and error correction as to the demodulated radio signal to thereby convert the demodulated radio signal into reception data and for transmitting the reception data to said host computer when the analyzing section determines that the demodulated radio signal is normal.

10. A communication system as claimed in claim 9, wherein said memory section stores a plurality of the data and the data stored in said memory section is transmitted when said transmission switch is actuated by the user.

11. A communication system for a wireless bar code reader comprising:

a wireless bar code reader transmitter for reading bar code information and transmitting a radio signal; and a receiver for receiving the radio signal from said wireless bar code reader transmitter and transmitting reception data to a host computer;

said wireless bar code reader transmitter including:
an optical section for detecting a bar code and outputting a signal representing the detected bar code;
an interpretation section for interpreting the signal from said optical section and converting into data; and
a radio transmitting section for modulating the data into the radio signal and radiating in the air, and said receiver including:
a radio receiving section for receiving and demodulating the radio signal radiated in the air; and
an analyzing section for analyzing and performing error detection and error correction as to the demodulated radio signal to thereby convert the demodulated radio signal into reception data and for transmitting the reception data to said host computer when the analyzing section determines that the demodulated radio signal is normal;

wherein said radio transmitting section of said wireless bar code reader transmitter has at least one of loop antenna arranged to surround an optical path of said optical section.

* * * * *

UNITED STATES PATENT AND TRADEMARK OFFICE
CERTIFICATE OF CORRECTION

PATENT NO. : 5,945,660
DATED : August 31, 1999
INVENTOR(S) : Nakasuji et al.

It is certified that error appears in the above-indentified patent and that said Letters Patent is hereby corrected as shown below:

Column 5, Line 12, delete "depending on" and insert
--, fading--.

Signed and Sealed this

Ninth Day of May, 2000

Attest:

Q. TODD DICKINSON

*Attesting Officer*     *Director of Patents and Trademarks*